(12) United States Patent
Lauderbach et al.

(10) Patent No.: US 6,557,924 B2
(45) Date of Patent: May 6, 2003

(54) ACTUATING SYSTEM FOR A HATCH OR SIMILAR HINGED STRUCTURE

(75) Inventors: Leo Lauderbach, Steinbach (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/127,378

(22) Filed: Apr. 22, 2002

(65) Prior Publication Data

US 2002/0174604 A1 Nov. 28, 2002

(30) Foreign Application Priority Data

Apr. 20, 2001 (DE) .......... 101 19 340

(51) Int. Cl.[7] ................ B60J 5/00
(52) U.S. Cl. .............. 296/146.4; 296/146.8; 296/107.01; 296/108; 49/280
(58) Field of Search ............ 296/146.4, 76, 296/146.8, 136, 108, 107.01; 343/786; 49/280, 32; 16/82; 60/593, 413, 476; 188/300; 91/42

(56) References Cited

U.S. PATENT DOCUMENTS

| | | | | |
|---|---|---|---|---|
| 4,308,541 A | * | 12/1981 | Frosch et al. .......... 343/786 |
| 4,333,269 A | * | 6/1982 | Bascou ............... 49/280 |
| 4,466,514 A | | 8/1984 | Molders et al. ......... 188/320 |
| 4,655,004 A | * | 4/1987 | Caillet ............... 49/280 |
| 4,689,849 A | * | 9/1987 | Eger et al. ............. 16/82 |
| 4,729,224 A | * | 3/1988 | McAteer ............. 60/593 |
| 4,865,169 A | * | 9/1989 | Rachels et al. ......... 188/300 |
| 5,655,331 A | * | 8/1997 | Schrader et al. ........ 49/280 |
| 5,727,442 A | * | 3/1998 | Wimmer .............. 91/42 |
| 5,788,312 A | * | 8/1998 | Lee ................... 296/76 |
| 5,836,050 A | * | 11/1998 | Rumez et al. .......... 16/82 |
| 5,839,719 A | * | 11/1998 | Hosan et al. .......... 188/300 |
| 5,851,050 A | * | 12/1998 | Squire et al. ......... 296/146.4 |
| 5,865,497 A | * | 2/1999 | Klein et al. ......... 296/146.8 |
| 5,921,604 A | * | 7/1999 | Yu et al. ............ 296/146.4 |
| 5,944,376 A | * | 8/1999 | Buchanan, Jr. ........ 296/146.4 |
| 5,982,126 A | | 11/1999 | Hellinga et al. ........ 318/468 |
| 5,986,420 A | * | 11/1999 | Kato .................. 49/32 |
| 6,059,346 A | * | 5/2000 | Moon ................. 296/146.4 |
| 6,092,336 A | | 7/2000 | Wright et al. .......... 49/339 |
| 6,145,917 A | * | 11/2000 | Ishii et al. .......... 296/146.4 |
| 6,179,100 B1 | | 1/2001 | Mintgen et al. ........ 188/282.1 |
| 6,217,105 B1 | * | 4/2001 | Hollerbach ........... 296/136 |
| 6,227,612 B1 | * | 5/2001 | Stolle et al. ......... 296/146.8 |
| 6,296,089 B1 | | 10/2001 | Koch et al. ........... 188/300 |
| 6,385,969 B1 | * | 5/2002 | Huber ................. 60/413 |
| 6,398,288 B1 | * | 6/2002 | Yuge ................. 296/146.4 |
| 6,418,715 B1 | * | 7/2002 | Huber ................. 60/476 |
| 6,425,621 B2 | * | 7/2002 | Miklosi et al. ........ 296/108 |
| 2002/0167194 A1 | * | 11/2002 | Mentink et al. ....... 296/107.01 |

FOREIGN PATENT DOCUMENTS

| | | |
|---|---|---|
| DE | 19649698 | 10/1997 |
| DE | 19820404 | 2/1999 |
| DE | 19938699 | 3/2000 |

OTHER PUBLICATIONS

German Search Report dated Feb. 27, 2002.

* cited by examiner

*Primary Examiner*—Kiran Patel

(57) ABSTRACT

An actuating system, comprising a base part and a moving part, which can be moved by a compressively preloaded piston/cylinder assembly that comprises a cylinder and a piston rod, wherein a piston on the piston rod divides the cylinder into two working chambers, wherein the base part has an externally powered drive device that stands in operative connection with the moving part and functions in opposition to the operating force of the piston/cylinder assembly, wherein a control system monitors the motion of the moving system and detects an obstacle when a parameter representing the motion deviates from a stored parameter by a threshold limit, wherein the actuating system in the unpowered state holds the moving part with the aid of a locking device, wherein the locking device is formed by a flow connection between the working chambers of the piston/cylinder assembly and a pilot valve for controllably blocking fluid flow through the flow connection.

6 Claims, 5 Drawing Sheets

ACTUATING SYSTEM FOR A HATCH OR SIMILAR HINGED STRUCTURE

BACKGROUND OF THE INVENTION

1. Technical Field of the Invention

The invention relates to an actuating system for a hatch or similar hinged structure of a vehicle in which a powered actuating system is operative to close the hatch against a spring force tending to open the hatch.

2. The Related Art

Actuating systems of this type have an electric drive that moves a hatch or vehicle door against the force of a spring element from an open operating position towards a closed position. In daily practice, it is often desired for the hatch to assume an intermediate position and to maintain it for a relatively long period of time, especially when the vehicle is parked. In order to be able to maintain the intermediate position of the hatch for a relatively long period of time, an electrically actuatable coupling is provided as part of the actuating system. The electrically actuatable coupling, however, must be continuously supplied with power. When the engine is switched off, the electrical power supply for the coupling must perforce come from the vehicle battery. This presents the risk that, if the vehicle is parked with a vehicle hatch in an intermediate position for an excessively long period of time, the battery will be discharged to such an extent as to endanger the engine starting process.

In order to deal with this problem, the actuating system in accordance with U.S. Pat. No. 6,092,336 is provided with a freewheel device in a gearbox for a cable drive unit. When the electrically actuatable coupling is unpowered, the freewheel device prevents the hatch from opening further.

The object of the present invention is to implement an actuating system for a moving part, in particular a hatch or the like, in which an intermediate position of the hatch can be maintained in an unpowered state and a costly gearbox can be omitted.

SUMMARY OF THE INVENTION

The foregoing and other objects are attained, in accordance with the invention, by the provision of a locking device, for holding the moving part in an intermediate position, in the form of a piston/cylinder assembly which includes a flow connection between the working chambers of the cylinder and a pilot value for controllably blocking fluid flow through the fluid connection.

As a result, any gearbox that may be associated with the drive device can have a far simpler structure. Furthermore, motion of the moving part, e.g. a hatch, in both directions can be halted by the lockable piston/cylinder assembly.

In order to achieve, firstly, high retention force on the moving part and, secondly, low energy consumption for the drive device, provision is made for the pilot valve to have a two-stage opening characteristic wherein, after a relatively large unblocking force is overcome, an operating motion can be performed with a smaller hold-open force.

In a relatively simple control version of the system, the threshold value is shifted independently of an intermediate position of the moving part such that the unblocking force is overcome by the drive device.

In a somewhat more complex solution, the control system has at least two threshold values, wherein one threshold value for an obstacle is overcome during motion of the moving part and a second threshold value is overcome by the drive device when the moving part is set into motion from a stop. In this way, a finer obstacle detection response is achieved for the moving part.

In an alternative solution, the pilot valve has an electric actuator that is disconnected from the power supply of a generator of a vehicle and moved to a locking position when the vehicle engine is stopped. As soon as the vehicle engine stops, locking is achieved in the unpowered state. During vehicle operation, a sufficient supply of power is available to continuously hold the pilot valve open if this is necessary.

For the situation where it is desired to actuate the pilot valve when the engine is stopped as well, power supply from a battery can be connected to the power supply of the generator.

BRIEF DESCRIPTION OF THE DRAWINGS

For a better understanding of the invention, reference may be to the following description of exemplary embodiments thereof, taken in conjunction with the accompanying drawings, in which.

DESCRIPTION OF EXEMPLARY EMBODIMENTS OF THE INVENTION

Figure 1:
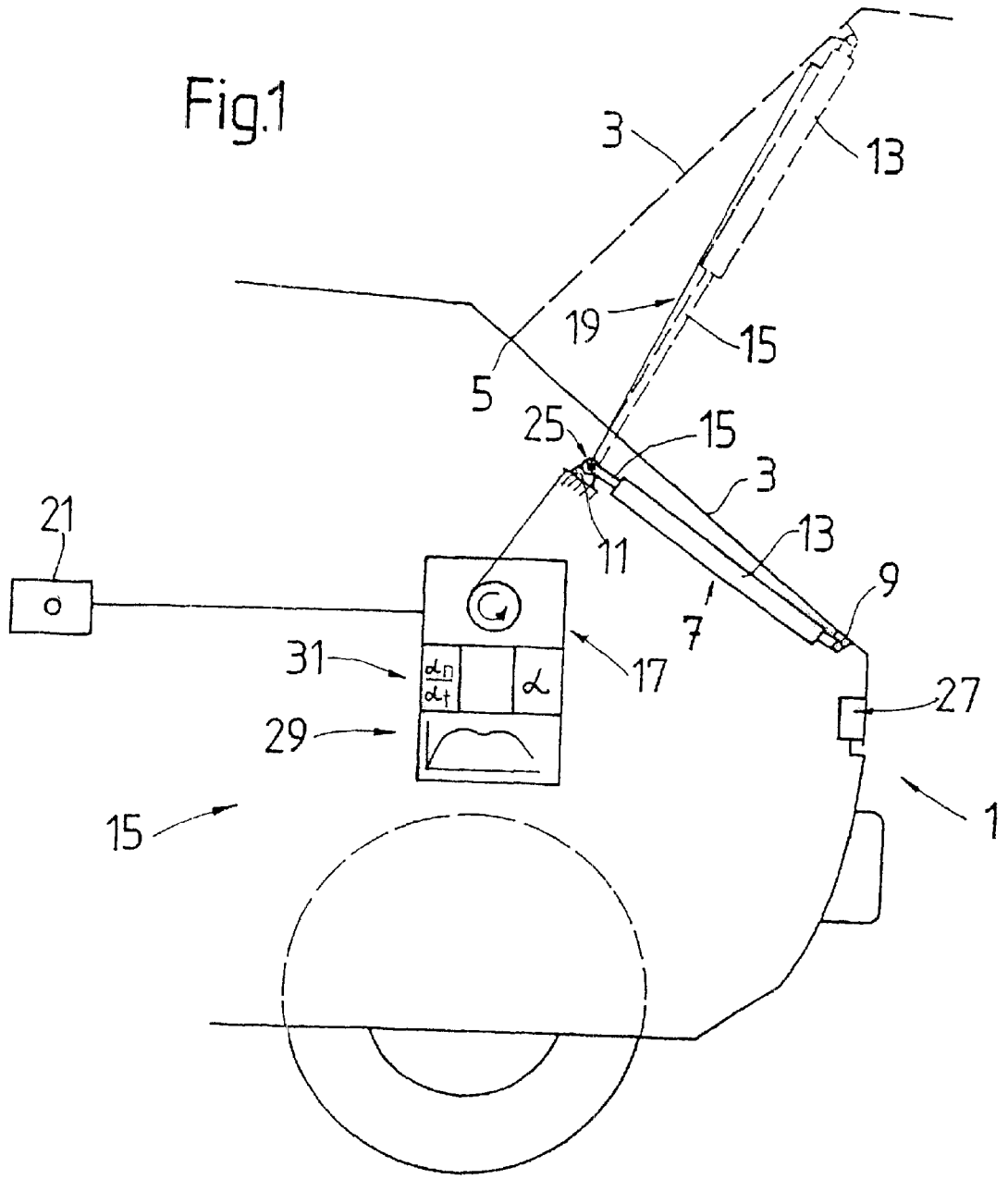
FIG. 1 is a schematic representation of an embodiment of the invention adapted to operate in conjunction with the hatch of a vehicle.

FIG. 1 is a schematic illustration of a motor vehicle with a body as a base part 1 and a moving part 3 embodied as the rear liftgate, hereinafter referred to simply as a hatch, since it can also involve a hood, a vehicle door or similar applications.

The hatch 3 is rotatably supported on an axis 5 that runs transverse to the vehicle. At least one piston/cylinder assembly 7 exerts a force on the hatch 3 in the direction of opening. The piston/cylinder assembly is preferably a gas spring which can, if necessary, have endpoint damping. The piston/cylinder assembly is attached to the base part and the hatch 3 via connecting elements 9 and 11, respectively. A cylinder 13 and a piston rod 15 are shown as the primary components of the piston/cylinder assembly 7. Two piston/cylinder assemblies 7, one on each side of the hatch 5, are preferably used for the opening motion of the hatch 5. The closed position of the hatch 3 and piston/cylinder assembly 7 are shown in solid lines, and the open position thereof in dashed lines, in FIG. 1.

The piston/cylinder assembly 7 may be implemented in accordance with U.S. Pat. Nos. 4,466,514, 6,179,100 and 6,296,089, the disclosures of which are hereby incorporated by reference.

The closing motion of the hatch against the push-out force of the piston/cylinder assemblies 7 is performed by an actuating system 15, which includes a drive device 17. The drive device is in operative connection with the hatch 3 through a cable device 19. When the drive device 17 is actuated, e.g., by means of a remote control 21, it drives a winding device 23 (see FIG. 2) so that the hatch is moved in the closing direction against the force of the piston/cylinder assemblies. The remote control 21 is equipped with a momentary trigger that is connected to a continuous signal until an end position, a new momentary trigger to stop the hatch, or an obstacle is encountered. Consequently, the momentary trigger requires only one button.

A sensor 25, preferably a rotary potentiometer, senses the hatch motion up to an angular region where a hatch lock 27 latches. The sensor 25 can be arranged on the axis 5, on the connecting elements 9, 11, or in the area of the drive device 19. The first time the hatch is operated, a control system 29 stores measurement points that represent the motion of the hatch. These measurement points represent angular data for the hatch position in connection with the instantaneous rotational speed of the sensor 25. The control system 29 determines the differential of the instantaneous rotational speed with respect to time and can detect irregularities, in other words excessive changes in rotational, through the use of a comparator unit 31. A change in rotational acceleration exceeding a threshold value is to be interpreted as the effect of an obstacle. When an obstacle is detected, the possibility exists that the hatch can be opened again by reversing the direction of rotation of the drive device 19.

The angle of closure of the hatch 3 in the region of action of the hatch lock 27 is not sensed, since relatively large irregularities in the hatch motion are present in this angular region that can only be filtered out with disproportionate effort.

Figure 2:
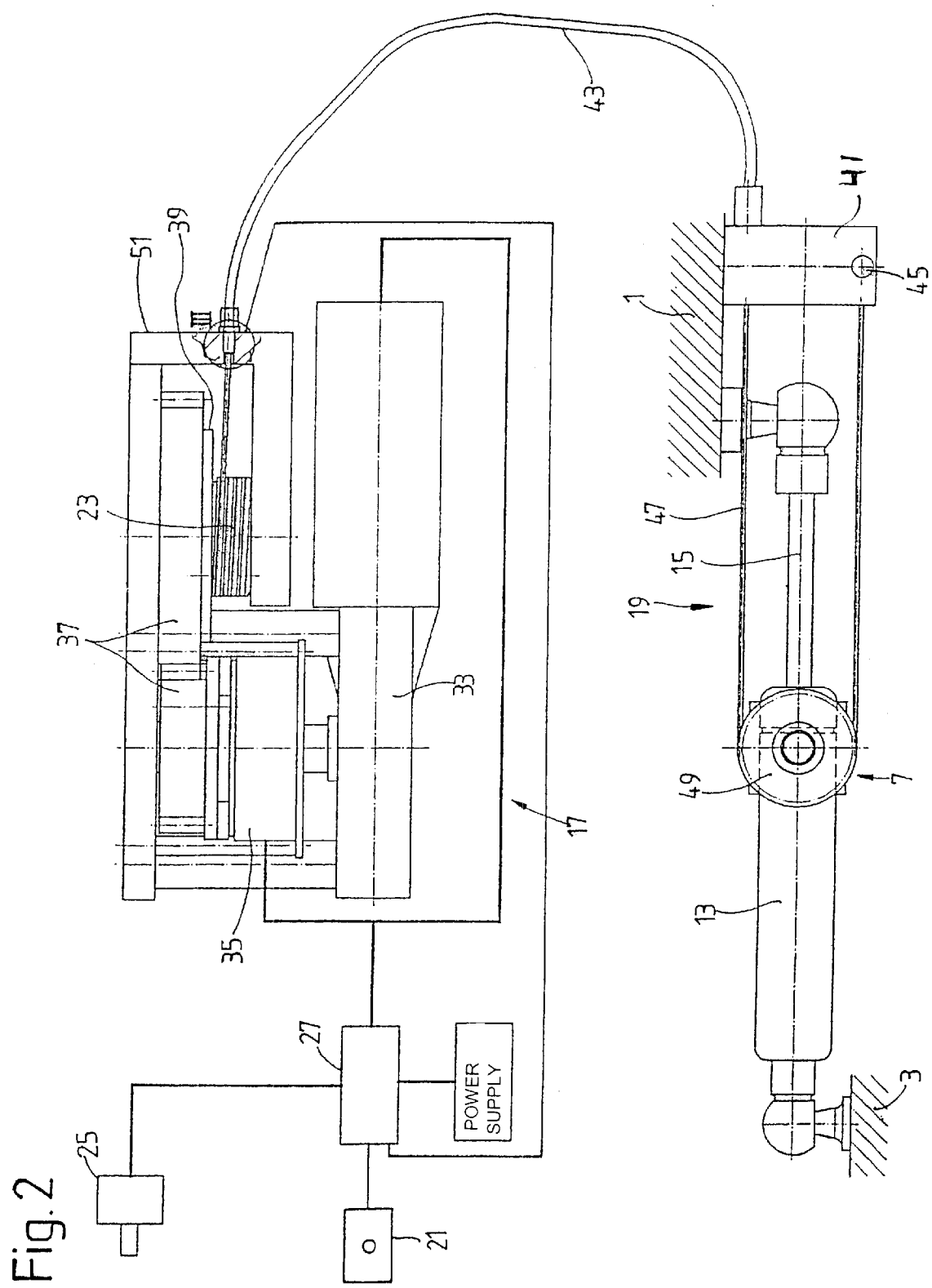
FIG. 2 is a diagrammatic illustration of an actuating system according to the invention.

FIG. 2 shows in particular the drive device 17, which in addition to an electric motor 33 has an electromagnetically actuated coupling 35. The coupling is followed by at least one gearbox stage 37, which in turn drives the winding device 23 for the cable device 19. Associated with the winding device is an accumulator 39 that drives the winding device 23 in the winding direction when the coupling is disengaged. The accumulator 39 can be a flat coil spring, for example.

The cable device 19 on the piston/cylinder assembly 7 in FIG. 2 is optionally embodied in a different manner from that of FIG. 1. In the example embodiment shown in FIG. 2, a cable guide 41 is used which supports a cable sleeve 43 of the cable device 19 and provides an attachment point 45 for a cable 47 that runs inside the cable sleeve. From the cable sleeve, the cable 47 passes over a deflection pulley 49—that stands in operative connection with the cylinder 13—to the attachment point 45 so that the cable forms a block and tackle.

As the illustration also makes evident, the cable sleeve 43 runs in a curve between an entrance section 51 of the winding device 23 and the cable guide 41.

Figure 3:
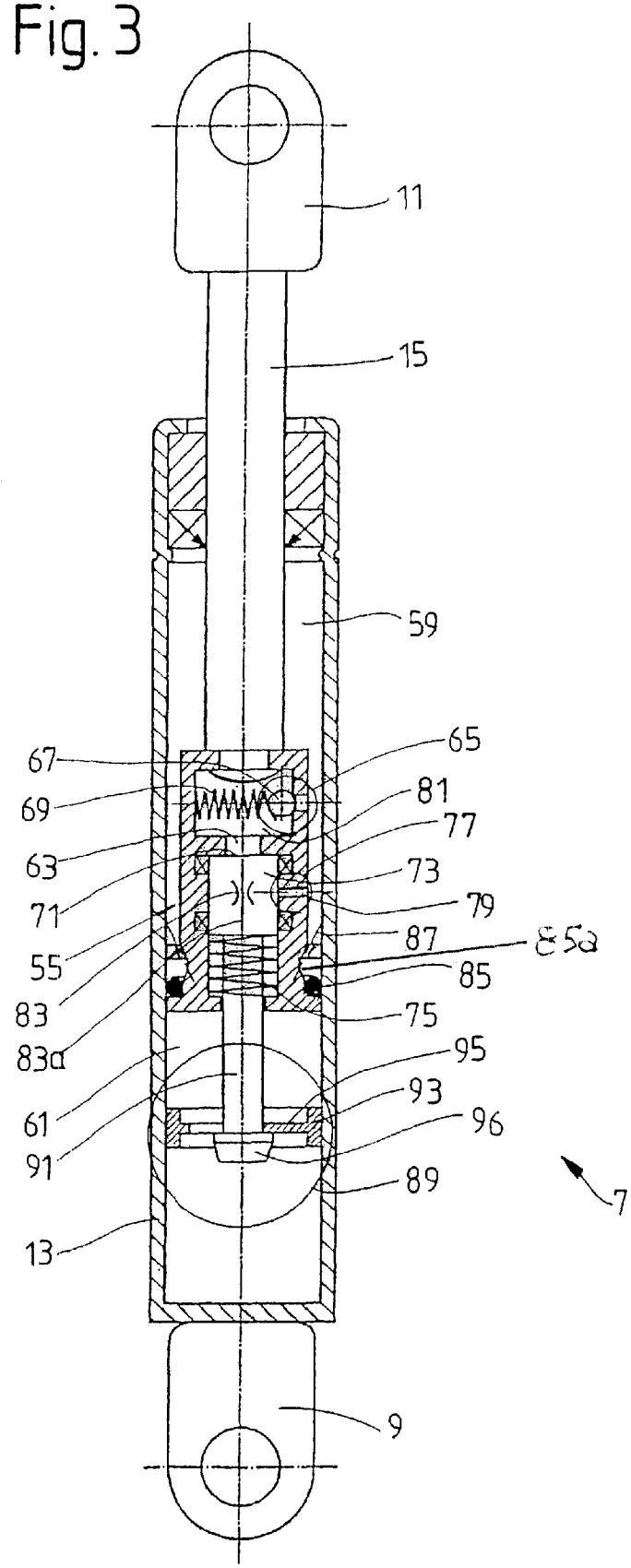
FIGS. 3 & 4 illustrate an embodiment of a piston/cylinder assembly in accordance with the invention.

FIG. 3 shows a piston/cylinder assembly 7 having a cylinder 13 in which a piston 55 on the piston rod 15 divides the cylinder into an upper lower working chambers 59 and 61. The cylinder 13 is filled with a pressurized fluid working medium, e.g., a gas or a liquid; when a liquid is used, an equalization chamber must be provided for the volume of the extending and retracting piston rod. Only one piston/cylinder assembly of this design need be used for the function of locking an intermediate position of the hatch 3.

A first flow connection 63, which is controlled by a two-stage pilot valve, exists between the two working chambers 59, 61. It can be opened by a first valve 65, which has a valve body 67, by an operating pressure in the working chamber 59 opposing the closing force of a first spring 69. The design of the first valve 65 corresponds to that of a check valve. A control surface 71 of a second valve body 73 is arranged in the further flow path, wherein the second valve body 73 and a second spring 75 form a second valve 77. The second valve body 73 is embodied as a slide valve that opens or closes a bypass 79 to the flow connection 63. The first flow connection 63 and the opened bypass 79 are joined in a collecting chamber 81. From there, the volume flows of the first and second valves are conducted into the lower working chamber 61 through a section 83a of the flow connection.

Installed within the section 83a of the flow connection 63 is a throttling point 83 that produces a significant pressure difference between the control surface 71 and the opposite end face. As will be understood, both the section 83a of the flow connection and the throttling point 83 are illustrated schematically in FIGS. 3 and 4.

In use, which is to say during an extension motion of the piston rod 15 (see FIG. 4), the first valve 65 opens due to the dynamic pressure in front of the first valve body 67. The throttling point 83 also causes a dynamic pressure to act in front of the control surface 71, which moves the second valve body 73 into the actuated position shown, where the bypass 79 produces a connection to the collecting chamber 81. As a function of the throttling resistances between the first and second valves, the first valve 65 can assume a closed actuation position without affecting the operating characteristics of the second valve 77 and thus the overall locking device.

In the direction of retraction of the piston rod 15, both valves 65, 77 are closed by their respective springs 69, 75. In order that the piston rod 15 of the locking device can be retracted, the piston 55 has a control ring 85 that opens an overpressure connection 87 between the two working chambers 59, 61. Above a defined retraction force, the control ring 85 is moved by frictional forces into a recessed control ring groove 85a, which allows flow to take place past the control ring 85, which otherwise forms a seal.

Figure 4:
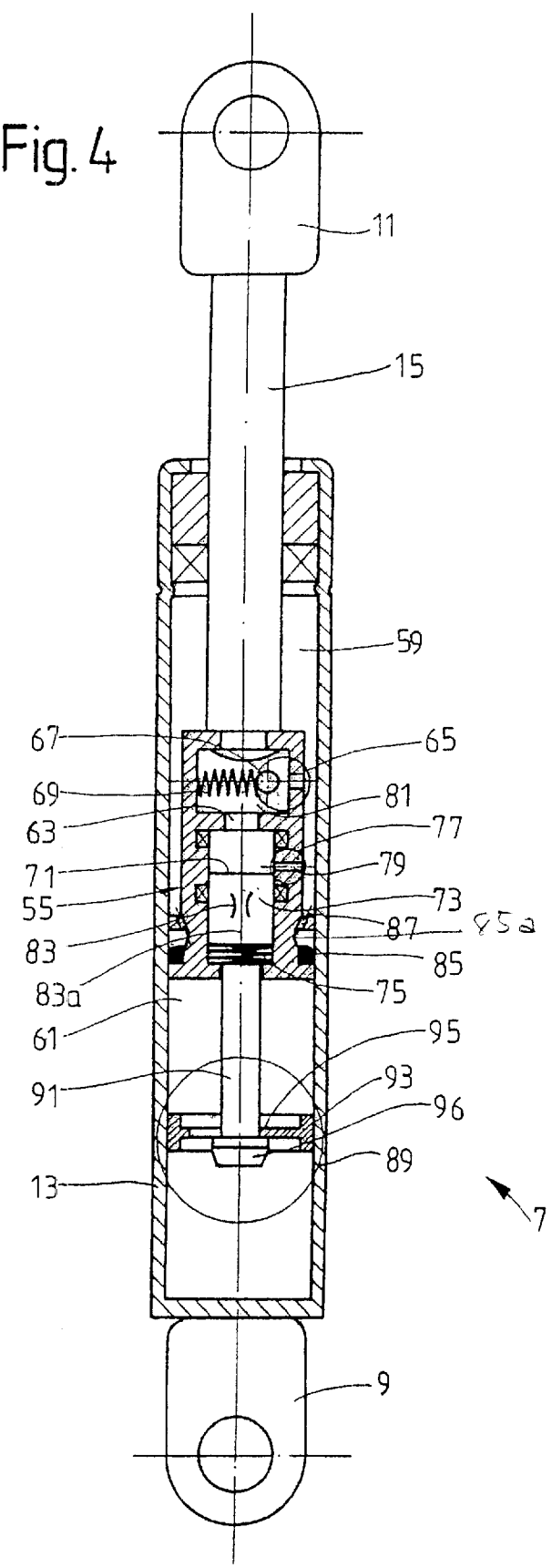

FIGS. 3 and 4 show an opening device 89 that consists of a valve tappet 91 of the second valve 77 and a holding mechanism 93 attached to the cylinder 13, where the holding mechanism has at least one spring element 95 in the form of a spring tab. A shoulder 96 on the valve tappet 91 engages the at least one spring element 95. The purpose of the opening device 89 is to achieve an opening motion of the second valve 77 independently of the dynamic pressures on the valves 65, 77 in order to achieve unlocking of the locking device with a small force, since the increased application of force to open the first valve 65 is eliminated.

During an extension motion of the piston rod 15 and the piston 55, the valve tappet 91 is initially held in place by the spring element 95. A further relative motion between the valve tappet 91 and the piston 55 corresponds to the opening motion of the second valve 77. Once the second valve 77 has opened, the spring force of the spring 75 of the second valve overcomes the holding force of the spring element 95, which then slides past the shoulder 96 and is thus out of engagement. During a retraction motion, the conical outer contour of the shoulder 96 passes through the holding mechanism 93. In this process, the control surface 71 of the second valve body 73 can move to its stop without affecting the retraction process, since the control valve ring 85 has opened the overpressure connection 87 and thus bypassed the first and second valves 65,77.

The opening direction is preferably associated with the position of maximum retraction of the piston/cylinder assembly 7, so that when the assembly 7 is used with a relatively large hatch the hatch can be opened from the closed position with minimum applied force.

In conjunction with the other components of the actuating system, the following operating behavior results:

As soon as the drive device 17 is unpowered, the coupling 35 is disengaged and the piston/cylinder assembly 7 is under operating pressure in the direction of opening of the hatch 3. As long as no external force acts on the hatch 3, the piston/cylinder assembly holds the hatch in place, since both valves 65, 77 and the control ring 85 block the connection between the working chambers 59, 61. The drive device or the gearbox 37 is under no load. In the event of a closing motion due to the external force of the drive device, the control ring 85 is moved into the control ring groove 85a, and flow can bypass it. Once the external force is no longer present, the control ring 85 resumes its locking function. In this way, locking of the hatch independent of the drive device can be achieved with very simple means.

If one uses a piston/cylinder assembly per U.S. Pat. No. 6,179,100, the disclosure of which is hereby incorporated into the present application by reference, then both directions are reliably locked by the piston/cylinder assembly 7 when the drive device is unpowered.

The piston/cylinder assembly 7 has an opening characteristic in which, first, a relatively large unblocking force and, then, a small hold-open force of the second valve 77 must be overcome. In connection with this opening characteristic, there are two options for designing a jam protection feature for the actuating system.

Thus, the threshold value that signals an obstacle can be set high enough that the unblocking force is overcome.

Alternatively, there is the option of setting two threshold values. A first threshold value represents the unblocking force for the first valve 65 and a second threshold value represents the hold-open force for the second valve 77. When the hatch is set into motion from a stop by the actuating system, the first threshold value is used as a limit value for obstacle detection until a defined closing speed is reached. During motion when the second valve 77 is open, the significantly lower threshold value can be used, thus significantly increasing the obstacle detection sensitivity.

Figure 5:
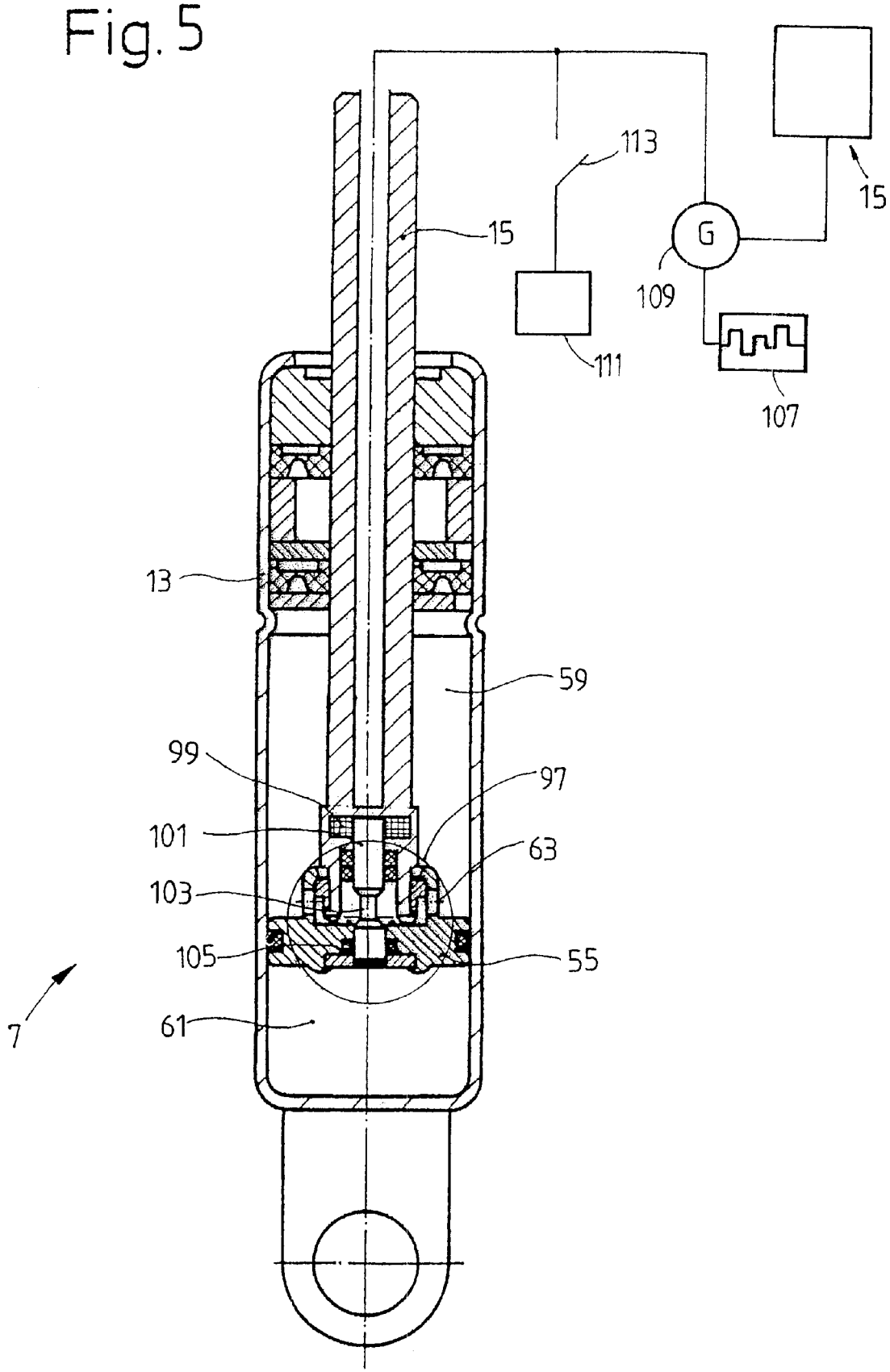
FIG. 5 illustrates another embodiment of a piston/cylinder assembly, with an electromagnetically actuated pilot valve.

FIG. 5 shows the piston/cylinder assembly 7 in an embodiment in which the flow connection 63 between the working chambers 59, 61 is controlled by an electromagnetically actuated pilot valve 97. Arranged on the piston rod 15, either inside or outside the cylinder 13, is a solenoid 99, which functions as an actuator to exert a displacing force on an armature 101 for an operating motion. In this case, an axially movable armature is used; a rotary armature is also possible. In the unpowered state of the solenoid 99, the armature 101 is moved to the closed operating position (shown in FIG. 5) by the operating pressure in the piston/cylinder assembly. In the pass-through position of the armature, a necked-down section 103 of the armature overlaps a seal 105 and flow can pass by it.

The solenoid 99 can be connected to two power sources. Power can be supplied by a generator 109 that is driven by the engine 107 and is used to supply power for the entire vehicle. In addition, power is supplied by a battery 111 wired in parallel and can be selectively used by means of a switch 113.

When the engine 107 is running, the actuating system is supplied with power by the generator 109, and one can move the hatch 3 therewith, in particular close it in the case of an actuating system with a cable device. If the engine is stopped and it is desired to hold the moving part, the hatch 3, in a specific intermediate position, one can actuate the solenoid 99 by means of the switch 113 and open the flow connection 63 between the working chambers 59, 61, by which means the hatch 3 performs an extending motion, since the locking medium within the cylinder 13 exerts an extending force on the piston rod 15. Once the hatch is brought to the desired position and the switch 113 is opened again, the armature 101 of the pilot valve is brought back to the locking position by the operating pressure. In this way, the desired position of the hatch 3 is locked without the use of external energy. The use of a pushbutton as the switch suggests itself, so as not to overstress the battery in the event of careless use of the switch.

For the undoubtedly very rare case that the engine cannot be started and the battery 111 is discharged to such a degree that the supply of power to the solenoid is no longer guaranteed, overpressure valves for each direction, which are not depicted, can be opened between the working chambers. The overpressure valves are designed with respect to opening pressure such that there is a significant separation between a normal pressure level for the holding function and an emergency operation where the overpressure valves are "overpressurized" by an external force on the hatch.

What is claimed is:

1. In an actuating system, comprising a base part and a moving part which can be moved by a compressively preloaded piston/cylinder assembly that comprises a cylinder and a piston rod, a piston on the piston rod dividing the cylinder into two working chambers, the base part having an externally powered drive device operatively connected to the moving part and functioning in opposition to the operating force of the piston/cylinder assembly, a control system monitoring the motion of the moving system and detecting an obstacle when a parameter representing the motion deviates from a stored parameter by a threshold limit, the actuating system in the unpowered state holding the moving part with the aid of a locking device, wherein the locking device is comprised by a flow connection between the working chambers of the piston/cylinder assembly and a pilot valve for controllably blocking fluid flow through the flow connection.

2. The actuating system in accordance with claim 1, wherein the pilot valve has a two-stage opening characteristic wherein, after a relatively large unblocking force is overcome, an operating motion of the piston/cylinder assembly can be performed with a smaller hold-open force.

3. The actuating system in accordance with claim 2, wherein the control system shifts the threshold value independently of an intermediate position such that the unblocking force is overcome by the drive device.

4. The actuating system in accordance with claim 2, wherein the control system has at least two threshold values, one threshold value is overcome for an obstacle during motion of the moving part and the second threshold value is overcome by the drive device when the moving part is set into motion from a stop.

5. The actuating system in accordance with claim 1, wherein, the base part includes a vehicle having an engine and a generator, and the pilot valve includes an electric actuator that is disconnected from the power supply of the generator and moved to a locking position when the vehicle engine is stopped.

6. The actuating system in accordance with claim 5, wherein a power supply from a battery can be connected to the power supply of the generator.

\* \* \* \* \*